United States Patent [19]

Lonsdale

[11] Patent Number: 4,786,798

[45] Date of Patent: Nov. 22, 1988

[54] BEAM FORMING AND COLLECTION LENS ASSEMBLY FOR LASER SCANNER SYSTEM

[75] Inventor: Randall J. Lonsdale, Eugene, Oreg.

[73] Assignee: Spectra-Physics Inc., San Jose, Calif.

[21] Appl. No.: 63,540

[22] Filed: Jun. 18, 1987

[51] Int. Cl.$^4$ .............................................. B29D 13/18
[52] U.S. Cl. ...................................... 250/216; 350/432; 250/566; 235/472
[58] Field of Search ................ 350/445, 446, 431–439; 250/203 R, 216, 221, 239; 235/472, 454

[56] References Cited

U.S. PATENT DOCUMENTS

| | | | |
|---|---|---|---|
| 3,481,672 | 12/1969 | Zoot | 350/437 |
| 3,991,275 | 11/1976 | Bulthuis | 250/566 |
| 3,994,008 | 11/1976 | Land et al. | 350/438 |
| 4,496,831 | 1/1985 | Swartz et al. | 235/472 |
| 4,675,531 | 6/1987 | Clark et al. | 235/472 |
| 4,678,288 | 7/1987 | Lonsdale et al. | 350/432 |

OTHER PUBLICATIONS

Amendment filed in Lonsdale application Ser. No. 06/604916, filed Apr. 27, 1984, now U.S. Pat. No. 4,678,288, 350/432.

*Primary Examiner*—Edward P. Westin
*Assistant Examiner*—Charles Wieland
*Attorney, Agent, or Firm*—Killworth, Gottman, Hagan & Schaeff

[57] ABSTRACT

A laser instrument of the kind used to detect light reflected from a target which is spaced from the laser instrument, includes a source laser for generating a laser high beam for transmission to the target and a bifocal lens assembly which is retro-directive in nature. The bifocal lens assembly is composed of a lens, and a mirror, much smaller in diameter than the lens, being attached to the lens for receiving and reflecting the laser light beam onto the optical axis of the lens. Respective small diverging and converging lens portions, formed on opposite sides of the lens and in alignment with its optical axis, expand and focus the received laser beam on the target. Respective large diameter converging lens portions, formed on opposite sides of the lens about the respective small diameter diverging and converging lens portions and in alignment with the optical axis of the lens, collect and focus on a light detector the light being reflected from the target. The lens assembly further includes a holder which releasably supports the lens in spaced relationship and aligns the light detector along the optical axis of the lens. Also, an optical bandpass filter is releasably supported by the holder between, and in spaced relationship to, the lens and light detector and along the optical axis of the lens.

29 Claims, 2 Drawing Sheets

BEAM FORMING AND COLLECTION LENS ASSEMBLY FOR LASER SCANNER SYSTEM

CROSS REFERENCE TO RELATED APPLICATION

Reference is hereby made to the following copending application dealing with related subject matter and assigned to the assignee of the present invention: "Trifocal Lens for a Laser Instrument" by R. Lonsdale et al, assigned U.S. Ser. No. 604,916 and filed Apr. 27, 1984, now U.S. Pat. No. 4,678,288.

BACKGROUND OF THE INVENTION

The present invention generally relates to laser instruments and, more particularly, to a bifocal lens assembly adapted for use in a laser scanner system which, on the same optical axis, transmits light to a spaced target, such as a product carrying a bar code symbol, and detects light reflected from the target.

Presently, bar code symbols are used on a broad range of retail products for check-out and inventory purposes and a variety of laser scanner systems have been developed to read such symbols. Both handheld and check-out counter-mounted scanner systems are widely used at the present time. In one version of such scanner systems, a retro-directive type optical system is employed in which a transmitted laser light beam is directed out along a path and the reflected light is collected back along the same path. Both bifocal and trifocal lens assemblies have been incorporated in the optical systems of such scanner systems.

One known bifocal lens assembly includes a large convex collection lens within which is formed a much smaller convex lens. The smaller lens is ordinarily positioned above the axis of the larger collection lens. In a retro-directive optical system employing such a bifocal lens, the laser beam is sent from the source laser through the smaller convex lens and then through scanning optics to the bar code target. The light reflected from the target is collected and received, in a much larger volume, through the large collection lens and focused and directed to a photodetector. Thus, the laser beam is originally transmitted through the smaller lens not along the optical axis of the larger lens, while the reflected and collected light passes back through the larger lens along its optical axis.

One known trifocal lens assembly of the above cross-referenced application includes a large collection lens having a first curved surface on the side which receives light reflected from a target and a second curved surface on the opposite side which faces a photodetector. Also, a small prism with a beam expander element thereon are integrally attached to and protrude outwardly from the second surface of the large collection lens, whereas a small focusing lens is formed on the first surface of lens. The small prism and beam expander element and the optical axis of the focusing lens are respectively disposed along and coaxial with the optical axis of the first and second surfaces of the large collection lens.

The beam expander element of the trifocal lens assembly first receives the laser beam at an angle inclined to the optical axis of the collection lens, and expands the beam. The expanded beam is reflected by the prism and routed along the collection lens optical axis to the focusing lens. The focusing lens converges the expanded beam and focuses it at the target via intervening scanning optics. A substantial volume of light reflected from the target is received back, via intervening scanning optics again, by the collection lens which images and transmits the collected light along the optical axis of the lens to a photodetector.

The challenge of the approach embodied in the above-described trifocal lens assembly is to somehow place on a common optical axis the components thereof which pass both transmitted light and reflected light without creating interference between the two. Although the prism and the beam expander element of the trifocal lens assembly protrude from the collection lens and are instrumental in routing the laser beam onto and along the optical axis of the collection lens, they are small enough in size so as to substantially minimize shadowing or obstruction of the reflected image.

Notwithstanding the fact that the trifocal lens assembly of the cross-referenced application is generally successful at accomplishing the objective of minimizing shadowing or obstruction of the reflected image, the prism and beam expander element thereof still tend to obscure a greater amount of the reflected light than is desirable. To obtain internal reflection within the prism of the laser beam, the angle between the beam and the optical axis of the lens must be rather large. This being the case, a somewhat elongated and enlarged prism element is required, which under environmental extremes causes the transmitted beam to be altered.

Consequently, a need exists for improvements in the arrangement and construction of the lens assembly so as to further reduce the degree to which the reflected image is obstructed and the transmitted beam altered by the protruding prism arrangement.

SUMMARY OF THE INVENTION

The present invention provides a bifocal lens assembly designed to satisfy the aforementioned needs. The bifocal lens assembly of the present invention avoids the problems of the prior trifocal lens assembly by providing an arrangement of components which cause expansion of the laser beam after reflection thereof onto the optical axis of the collection lens of the assembly. Such sequence permits use of a smaller reflecting surface, and results in less blockage of returning light and less alteration of the transmitted light, than where the beam is first expanded and then reflected as in the prior trifocal lens assembly.

In accordance with the present invention, a lens assembly is provided for a laser instrument of the kind used to detect light reflected from a target which is spaced from the laser instrument. The lens assembly comprises a lens having an optical axis, light detector means spaced from the lens and first through fifth optical means associated with the lens.

The first optical means is attached to the lens and aligned with the optical axis thereof for receiving a laser light beam being transmitted to the lens at an angle off the optical axis thereof and for reflecting the received laser beam onto the optical axis for transmission through the lens toward the target. The first optical means may be a mirror attached to a plurality of legs that are molded with the lens. This arrangement mounts the mirror in alignment with and at an angle to the optical axis of the lens. The mirror is substantially smaller in diameter than the lens. With the small mirror being mounted on several short individual support legs, a smaller portion of the volume of the reflected light will be blocked.

The second optical means is formed on the lens at the optical axis and on one side thereof adjacent the small mirror for receving the reflected laser beam therefrom and expanding the same within the lens as it is transmitted therethrough. Further, the second optical means may be a diverging lens portion formed on the lens on the one side thereof and aligned about the optical axis thereof. The diverging lens portion has a concave curvature and is substantially smaller in diameter than the lens.

The third optical means is formed on the lens about the optical axis and on an opposite side thereof from the second optical means for converging and focusing the expanded laser beam at a substantial distance from the lens as it is transmitted therefrom. Further, the third optical means may be a first converging lens portion formed on the lens on the opposite side thereof and aligned about the optical axis thereof. The coverging lens portion has a convex curvature and is substantially smaller in diameter than the lens.

The fourth optical means is formed on the lens about the optical axis and on the opposite side thereof and about the thrid optical means thereon for collecting within the lens the light reflected from the target and transmitting the collected light therethrough. Further, the fourth optical means may be a second converging lens portion formed on the lens on the opposite side thereof and about the first converging lens portion. The second converging lens portion has a convex curvature and is aligned about the optical axis of the lens and substantially larger in diameter than the first converging lens portion.

The fifth optical means is formed on the lens about the optical axis and on the one side thereof opposite from the fourth optical means. The fifth optical means may be formed on the lens about the second optical means thereon for imaging the collected light along the optical axis of the lens to the light detector means. Further, the fifth optical means may be a third converging lens portion formed on the lens on the one side thereof and about the diverging lens portion. The third converging lens portion has a convex curvature and is aligned about the optical axis of the lens and substantially larger in diameter than the diverging lens portion.

The lens assembly further includes an optical bandpass filter located between the lens and the light detector means. Also, the assembly includes a holder for supporting the lens and the light detector means in spaced relationship with the bandpass filter supported therebetween. The holder aligns the bandpass filter and the light detector means along the optical axis of the lens. More particularly, the holder includes a hollow body and a plurality of releasable latching elements on the body for engaging and releasably holding the lens, filter and light detector means in the body in the spaced relationship with respect to one another, with the filter and light detector means being aligned along the optical axis of the lens.

Further, in accordance with the present invention, a laser instrument is provided being of the kind used to detect light reflected from a target which is spaced from the laser instrument. The laser instrument comprises laser means for generating a laser beam for transmission to the target, light detector means for detecting light reflected from the target, and the above-defined lens assembly.

Accordingly, it is an object of the present invention to provide a bifocal lens assembly for a laser instrument which is retro-directive in nature; to provide a small mirror attached to a lens of the assembly for reflecting a laser light beam onto an optical axis of the lens; to provide such lens with small diameter diverging and converging central lens portions formed on opposite sides thereof and along its optical axis which expand and focus the laser beam on a spaced target; to provide such lens with large diameter converging lens portions formed on opposite sides thereof about the smaller lens portions which collect and focus the light reflected from the target on a detector means; to provide a lens assembly in which the lens, detector means and a bandpass filter are releasably assembled in a holder with the detector means and filter disposed in spaced relation to the lens and along its optical axis; and to provide a lens assembly which is extremely simple in construction, reliable and whose components are self-aligning when assembled in the holder.

DETAILED DESCRIPTION OF THE PREFERRED EMBODIMENT

Figure 1:
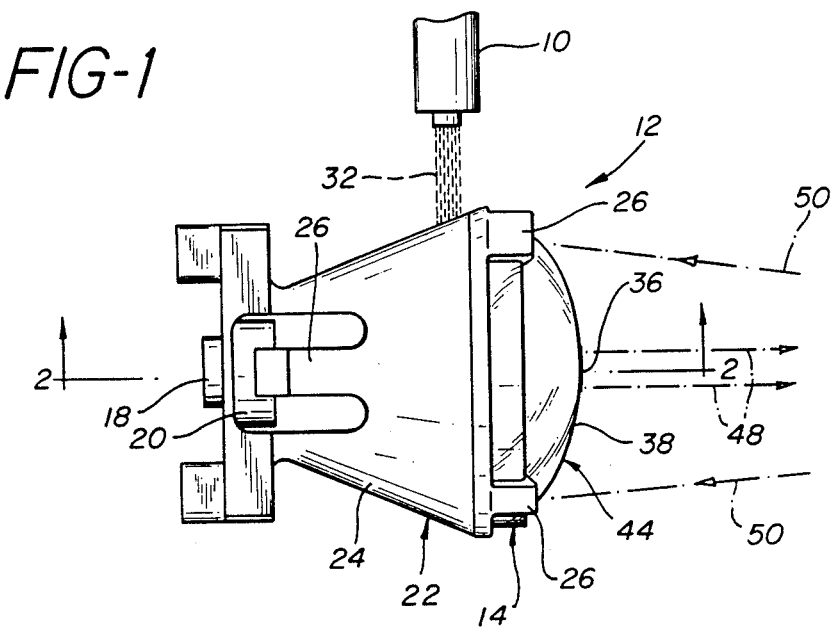
FIG. 1 is a side elevational view of a bifocal lens assembly constructed in accordance with the principles of the present invention.
Figure 2:
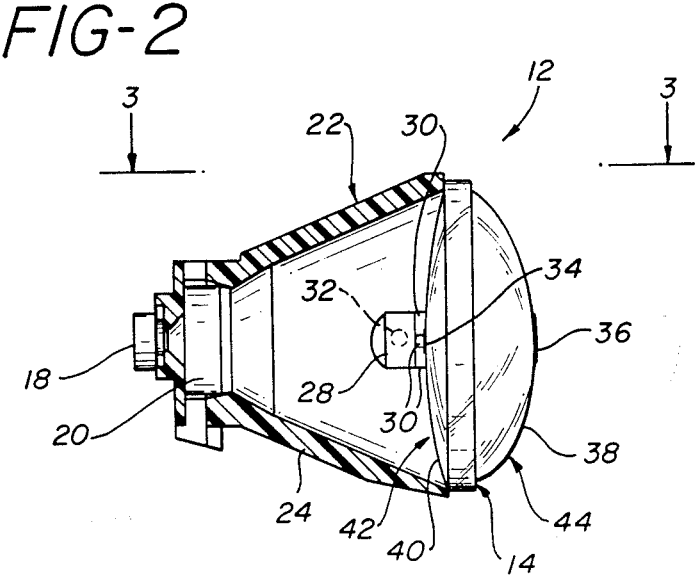
FIG. 2 is a longitudinal axial sectional view of a holder of the lens assembly as taken along line 2—2 of FIG. 1, with the remainder of the assembly components being shown in side elevation.

Reference is made to FIGS. 1 and 2 of the drawings which illustrate a laser source 10 and a bifocal lens assembly 12 comprising several of the components of a laser instrument such as of a laser scanner system. The scanner system is used to detect light reflected from a target, such as a product bearing a universal product code symbol, which is spaced from the instrument. The laser scanner system may be either of the handheld type or the counter-mounted type.

Other components of a laser scanner system which are employed with the laser source 10 and the lens assembly 12 may be categorized as a beam scanning or sweeping system. Such a sweeping system does not form any part of the present invention and thus illustration and description thereof is not necessary herein for gaining a clear understanding of the present invention. Suffice it to say that the beam sweeping system is interposed between the target and the lens assembly 12. Conventionally, a suitable sweeping system may be mounted below a check-out counter and include a rotating mirror or pentaprism, and with additional stationary mirrors, positioned in the path of the outgoing beam from the lens assembly. The sweeping system routes the outgoing beam toward the product such that it sweeps across a larger area at the location of the product code symbol than the actual cross-section of the beam itself. (The outgoing beam produced by the lens assembly 12 is approximately only 0.00874 inch in diameter at a point approximately 16.80 inches from the lens assembly.) The sweeping system also receives the light reflected back from the product and routes it to the bifocal lens assembly 12 which is retro-directive in nature.

In its basic components, the retro-directive bifocal lens assembly 12 includes a lens 14 having an optical axis 16 and a photodetector 18. Also included is an optical bandpass filter 20. The photodetector 18 and filter 20 may take any suitable form, both being per se conventional. The function of the filter 20 is to eliminate stray light noise from the returning beam before it is applied to the photodetector 18. The lens assembly 12 also includes a holder 22 for supporting the lens 14 and photodetector 18 in a stationary spaced relationship with the filter interposed therebetween. The photodetector 18 and filter 20 are supported by the holder 22 in alignment with and along the optical axis 16 of the lens 14. More specifically, the holder 24, which may be composed from a suitable molded plastic, has a hollow body 24 and a plurality of releasable latching elements 26 in the form of tapered surfaces and resiliently flexible snap legs on the body for engaging and releasably holding the lens 14, photodetector 18 and filter 20 in their intended positions within the body.

Referring to FIGS. 3–7, as well as to FIGS. 1 and 2, the lens assembly 12 is shown to further include a first optical means in the form of a mirror 28 substantially smaller in diameter than the lens 14 and a plurality of short legs 30, for instance three in number, molded integrally with the lens 14 and attached to the mirror 28, such as by any suitable adhesive, so as to mount the mirror in alignment with the optical axis 16 of the lens 14. Also, the legs 30 have tapered outer surfaces configured to place the mirror 28 at a desired angle, such as preferably forty-five degrees, with respect to the lens optical axis 16. In such position, the mirror 28 is placed for receiving and reflecting a laser light beam 32, being generated by the laser source 10, onto the optical axis 16 of the lens 14 for transmission therethrough to the target. It should be mentioned at this point that the laser source 10 can be a helium-neon laser tube which produces a laser beam of red light at 632.8 nanometers (nm). Of course, other types of laser sources can be used.

Figure 3:
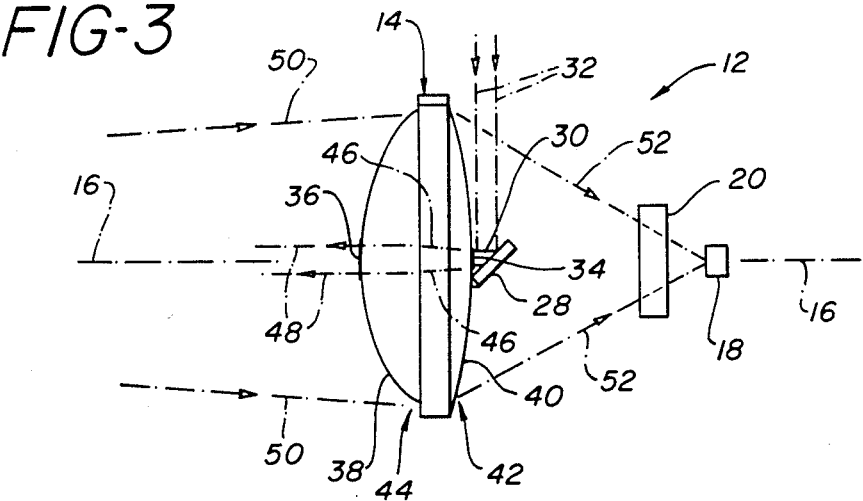
FIG. 3 is a side elevational view of the components of the lens assembly removed from the assembly holder and disposed in their relative positions, also illustrating the retro-directive nature of the lens assembly by broken lines representing the paths of the outgoing transmitted and incoming reflected light.
Figure 4:
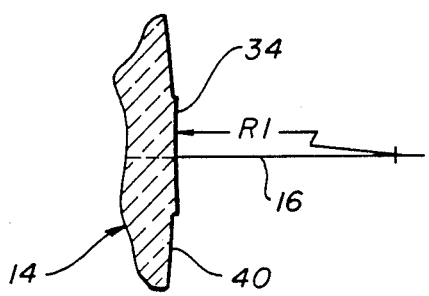
FIG. 4 is an enlarged axial sectional view of a fragmentary portion of a lens of the lens assembly, showing a small diverging lens portion having a concave curvature and being formed on one side of the lens at its optical axis.

Additionally, the lens assembly 12 includes second and third optical means in the form of respective small diameter diverging and converging lens portions 34, 36 and fourth and fifth optical means in the form of large diameter converging lens portions 38, 40, all of which are integrally formed on respective opposite sides 42, 44 of the lens 14. The small diameter diverging lens portion 34 is formed on the inner side 42 of the lens 14 in alignment with the optical axis 16 thereof and has a diameter substantially smaller than that of the lens 14. The diverging lens portion 34, as best seen in FIG. 4, has a radius R1 extending from exterior of the lens 14 providing the lens portion 34 with slightly concave exterior curvature. As schematically shown in FIG. 3, due to such curvature the diverging lens portion 34 receives the laser beam 32 reflected by the mirror 28 and expands it into an expanded light beam 46 which travels through the lens 14.

Figure 5:
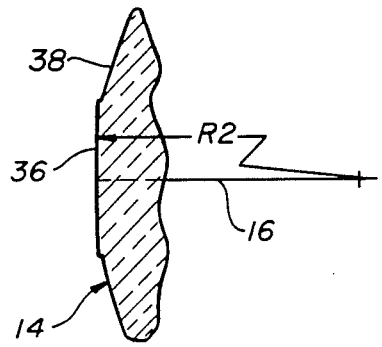
FIG. 5 is an enlarged axial sectional view of a fragmentary portion of the lens, showing a small converging lens portion having a convex curvature and being formed on an opposite side of the lens at its optical axis.

The small diameter converging lens portion 36 is formed on the outer side 44 of the lens 14 in alignment with the optical axis 16 thereof and, like the diverging lens portion 34, also has a diameter substantially smaller than that of the lens 14. The converging lens portion 36, as best seen in FIG. 5, has a radius R2 extending from the interior of the lens 14 providing the lens portion 36 with slightly convex exterior curvature. As shown schematically in FIG. 3, due to such curvature, the converging lens portion 36 receives the expanded beam 46 from the diverging lens portion 34 and converges it at a very slight angle to provide an outgoing beam 48 which is focused on the target.

Figure 7:
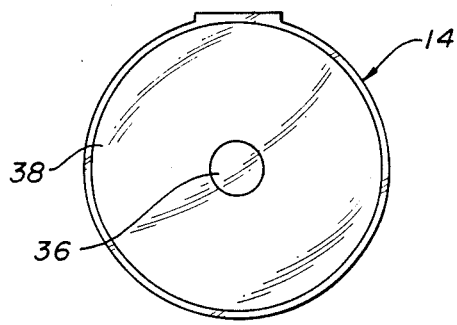
FIG. 7 is an end elevational view of the lens, showing another large converging lens portion being formed on the opposite side of the lens about the small converging lens portion thereon.

One large diameter converging lens portion 38 is formed on the outer side 44 of the lens 14 about the small diameter converging lens portion 36 and in alignment with the optical axis 16 of the lens 14. The one large diameter converging lens portion 38 has a convex curvature and, as can be best seen in FIG. 7, is substantially larger in diameter than the small diameter converging lens portion 36. As shown schematically in FIG. 3, the lens portion 38 collects incoming light 50 which is reflected from the target and transmits it through the lens 14.

Figure 6:
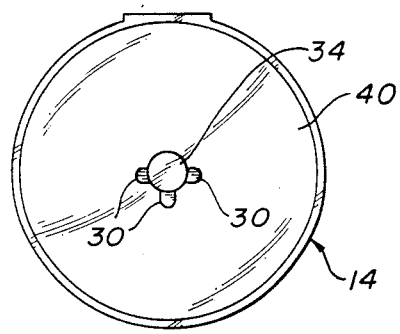
FIG. 6 is an end elevational view of the lens of the lens assembly, showing a plurality of short legs which support the small mirror of the assembly and showing a large converging lens portion being formed on the one side of the lens about the small diverging lens portion thereon.

The other larger diameter converging lens portion 40 is formed on the inner side 42 of the lens 14 about the small diameter diverging lens portion 34 and in alignment with the optical axis 16 of the lens 14. The other converging lens portion 40 has a convex curvature and, as can be best seen in FIG. 6, is substantially larger in diameter than the small diameter diverging lens portion 34. As shown schematically in FIG. 3, the other lens portion 40 images the collected beam as a focussed beam 52 on the photodetector 18 via the bandpass filter 20.

It will be observed that with the lens assembly 12 of the present invention, expansion of the outgoing beam by the small diameter diverging lens portion 34 takes place after reflection of the laser beam by the small mirror 28. This allows a smaller reflecting surface than where the beam is first expanded and then reflected, as done previously. With the small mirror 28, according to the present invention, mounted on the support legs 30, a smaller portion of the cone of the incoming or returning light is blocked than heretofore.

Having thus described the bifocal lens assembly of the present invention in detail and by reference to a preferred embodiment thereof, it will be apparent that modifications and variations are possible without departing from the scope of the invention defined in the appended claims.

What is claimed is:

1. A lens assembly for a laser instrument of the kind used to detect light reflected from a target which is spaced from the laser instrument, said lens assembly comprising:

a lens having an optical axis;

light detector means spaced from said lens;

first optical means attached to said lens and aligned with said optical axis thereof for receiving a laser light beam being transmitted to said lens at an angle off said optical axis thereof and for reflecting said received laser beam onto said optical axis for transmission through said lens toward the target;

second optical means formed on said lens at said optical axis and on one side thereof adjacent to said first optical means for receiving said reflected laser beam and expanding the same within said lens as it is transmitted therethrough;

third optical means formed on said lens at said optical axis and on an opposite side thereof from said second optical means for converging and focussing said expanded laser beam at a substantial distance from said lens as it is transmitted therefrom;

fourth optical means formed on said lens about said optical axis and on said opposite side thereof and about said third optical means thereon for collecting within said lens the light reflected from the target and transmitting said collected light therethrough; and fifth optical means formed on said lens about said optical axis and on said one side thereof opposite from said fourth optical means and about said second optical means thereon for imaging said collected light along said optical axis of said lens to said light detector means.

2. The lens assembly of claim 1 further comprising: an optical bandpass filter located between said lens and said light detector means.

3. The lens assembly of claim 1 in which said first optical means is a plurality of legs molded with said lens, and a mirror mounted on said legs in alignment with and at an angle to said optical axis of said lens.

4. The lens assembly of claim 3, in which said mirror is substantially smaller in diameter than said lens.

5. The lens assembly of claim 1 in which said second optical means is a diverging lens portion formed on said lens on said one side thereof and aligned with said optical axis thereof.

6. The lens assembly of claim 5 in which said diverging lens portion has a concave curvature and is substantially smaller in diameter than said lens.

7. The lens assembly of claim 1 in which said third optical means is a first converging lens portion formed on said lens on said opposite side thereof and aligned with said optical axis thereof.

8. The lens assembly of claim 7 in which said first converging lens portion has a convex curvature and is substantially smaller in diameter than said lens.

9. The lens assembly of claim 1 in which said fourth optical means is a second converging lens portion formed on said lens on said opposite side thereof and about said first converging lens portion, said second converging lens portion being aligned with said optical axis of said lens.

10. The lens assembly of claim 9 in which said second converging lens portion has a convex curvature and is substantially larger in diameter than said first converging lens portion.

11. The lens assembly of claim 1 in which said fifth optical means is a third converging lens portion formed on said lens on said one side thereof and about said diverging lens portion, said third converging lens portion being aligned with said optical axis of said lens.

12. The lens assembly of claim 11 in which said third converging lens portion has a convex curvature and is substantially larger in diameter than said diverging lens portion.

13. The lens assembly of claim 1 further comprising: a holder for supporting said lens and said light detector means in spaced relationship and aligning said light detector means along said optical axis of said lens.

14. The lens assembly of claim 13 further comprising: an optical bandpass filter supported by said holder between and in spaced relationship to said lens and said light detector means and along said optical axis of said lens.

15. The lens assembly of claim 13 in which said holder includes a hollow body and a plurality of releasable latching elements on said body for engaging and releasably holding said lens and a bandpass filter in said body.

16. A retro-directive bifocal lens assembly for a laser instrument of the kind used to detect light reflected from a target which is spaced from the laser instrument, said lens assembly comprising:

a lens having an optical axis;

light detector means spaced from said lens;

a mirror substantially smaller in diameter than said lens being attached to said lens for receiving and reflecting a laser light beam onto said optical axis of said lens;

respective small diameter diverging and converging lens portions formed on opposite sides of said lens and in alignment with said optical axis thereof for expanding and focusing said received laser beam on the target; and respective large diameter converging lens portions formed on said opposite sides of said lens about said respective small diameter diverging and converging lens portions and in alignment with said optical axis of said lens for collecting and imaging on said detector means light being reflected from the target.

17. The bifocal lens assembly of claim 16 further comprising:

a plurality of legs attached to said lens and to said mirror so as to mount said mirror in alignment with and at an angle to said optical axis of said lens.

18. The bifocal lens assembly of claim 16 in which said diverging lens portion has a concave curvature and is substantially smaller in diameter than said lens.

19. The bifocal lens assembly of claim 16 in which said first converging lens portion has a convex curvature and is substantially smaller in diameter than said lens.

20. The bifocal lens assembly of claim 16 in which said second converging lens portion has a convex curvature and is substantially larger in diameter than said first converging lens portion.

21. The bifocal lens assembly of claim 16 in which said third converging lens portion has a convex curvature and is substantially larger in diameter than said diverging lens portion.

22. The bifocal lens assembly of claim 16 further comprising:

a holder for supporting said lens and said light detector means in spaced relationship and aligning said light detector means along said optical axis of said lens.

23. The bifocal lens assembly of claim 22 further comprising:
  an optical bandpass filter supported by said holder between and in spaced relationship to said lens and said light detector means and along said optical axis of said lens.

24. The bifocal lens assembly of claim 22 in which said holder includes a hollow body and a plurality of releasable latching elements on said body for engaging and releasably holding said lens and a bandpass filter in said body.

25. In a laser instrument of the kind used to detect light reflected from a target which is spaced from the laser instrument, the combination comprising:
  laser means for generating a laser light beam for transmission to the target; and
  a bifocal lens assembly including light detector means for detecting light reflected from the target, a lens, a mirror substantially smaller in diameter than said lens being attached to said lens for receiving and reflecting said laser light beam onto said optical axis of said lens, respective small diverging and converging lens portions formed on opposite sides of said lens and in alignment with said optical axis thereof for expanding and focusing said received laser beam on the target, and respective large diameter converging lens portions formed on said opposite sides of said lens about said respective small diameter diverging and converging lens portions and in alignment with said optical axis of said lens, for collecting and imaging on said detector means light being reflected from the target.

26. The laser instrument of claim 25 further comprising:
  a plurality of legs molded with said lens and attached to said mirror so as to mount said mirror in alignment with and at an angle to said optical axis of said lens.

27. The laser instrument of claim 25 further comprising:
  a holder for supporting said lens and said light detector means in spaced relationship and aligning said light detector means along said optical axis of said lens.

28. The lens assembly of claim 27 further comprising:
  an optical bandpass filter supported by said holder between and in spaced relationship to said lens and said light detector means and along said optical axis of said lens.

29. The lens assembly of claim 27 in which said holder includes a hollow body and a plurality of releasable latching elements on said body for engaging and releasably holding said lens and a bandpass filter in said body.

* * * * *